(12) United States Patent
Reul

(10) Patent No.: US 8,278,609 B2
(45) Date of Patent: Oct. 2, 2012

(54) METHOD AND DEVICE FOR BRAZING CONNECTIONS BY INDUCTION HEATING

(75) Inventor: Bernhard Reul, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 566 days.

(21) Appl. No.: 11/720,370

(22) PCT Filed: Nov. 16, 2005

(86) PCT No.: PCT/FR2005/050952
§ 371 (c)(1),
(2), (4) Date: May 29, 2007

(87) PCT Pub. No.: WO2006/059025
PCT Pub. Date: Jun. 8, 2006

(65) Prior Publication Data
US 2008/0164248 A1 Jul. 10, 2008

(30) Foreign Application Priority Data

Nov. 30, 2004 (DE) .......................... 10 2004 057 630

(51) Int. Cl.
*B23K 13/01* (2006.01)
*B60L 1/02* (2006.01)
*H05B 3/06* (2006.01)
*H05B 3/08* (2006.01)
*H05B 3/16* (2006.01)
*H05B 6/04* (2006.01)

(52) U.S. Cl. ........ 219/617; 219/203; 219/522; 219/541; 219/543; 219/602; 219/603; 219/611; 219/670; 219/671

(58) Field of Classification Search ................... 219/617, 219/203, 522, 543, 541, 603, 670, 671, 602, 219/611
See application file for complete search history.

(56) References Cited

U.S. PATENT DOCUMENTS 3,813,519 A 5/1974 Jochim et al.
4,415,116 A * 11/1983 Norton ..................... 228/180.21

FOREIGN PATENT DOCUMENTS

DE 44 19 258 12/1995
(Continued)

OTHER PUBLICATIONS

DE4419258.pdf and DE19636216.pdf are machine translation.*

*Primary Examiner* — Tu B Hoang
*Assistant Examiner* — Ket D Dang
(74) *Attorney, Agent, or Firm* — Oblon, Spivak, McClelland, Maier & Neustadt, L.L.P.

(57) ABSTRACT

A method and device for soldering plural electrical connections, in which contact elements have to be soldered to soldered-connection faces positioned on a non-metallic glazing. In the method a soldering tool is used to emit a magnetic field towards the solder spots to heat these by induction. The magnitude and shape of the soldering tool is sized according to the surface area over which plural solder spots that have to be heated simultaneously in a soldering operation are situated. At the same time, the frequency of an AC voltage applied to the loop or to the coil is tailored to the connection geometry and set to 150 kHz at most. Thus, for a high work rate, markedly better heating of the components that need to be soldered is obtained because the low-frequency field lines have a greater depth of penetration into the bodies.

19 Claims, 1 Drawing Sheet

FOREIGN PATENT DOCUMENTS

| | | | |
|---|---|---|---|
| DE | 4419258 A1 * | 12/1995 | |
| DE | 19636216 A1 * | 3/1998 | |
| EP | 0 070 909 | 2/1983 | |
| GB | 1 183 316 | 3/1970 | |
| GB | 2 139 684 | 11/1984 | |
| JP | 5-206200 | 8/1993 | |
| JP | 7-237940 | 9/1995 | |
| JP | 8-236529 | 9/1996 | |
| JP | 2001-44616 | 2/2001 | |

* cited by examiner

METHOD AND DEVICE FOR BRAZING CONNECTIONS BY INDUCTION HEATING

The invention relates to a method for soldering connections by inductive heating and to a particularly suitable device for implementing this method.

BACKGROUND OF THE INVENTION

Document GB-1 183 316 discloses methods for the inductive soldering of heating wires placed in parallel with their collector conductors. In the first embodiment, the heating wires are fixed by bonding onto a glazing surface and the collector conductor—a thin strip of tinned copper—is positioned over the top. The soldering tool is guided over the same surface of the glazing with a constant stand-off distance along the collector conductor using spacer rollers. In the second embodiment, the heating wires and the collector conductors are inaccessible from the outside in a laminated glazing unit made up of two sheets of glazing and an adhesive layer. Here, electrical contact between the heating conductors and their collector conductors is to be made only after the laminated glazing unit has been produced. To achieve this, use is made of the ability of a magnetic field to transmit, without contact, through one of the sheets of glazing, the energy required to melt the solder; this sheet of glazing in this instance acts as the "spacer" for the hand-guided soldering tool.

It is known that such glazing is used especially in motor vehicle manufacture, but also in buildings. Other typical applications are, for example, the soldering of contact bases for connection lines. These are becoming increasingly small in order to save space in motor vehicle manufacturing and are often also provided with cable connections, which may prove awkward when soldering tools are being applied directly (see EP 477 069 B1). Likewise, electronic components such as amplifiers or the like are already soldered directly to antenna conducting fields printed onto an external surface of the glazing.

For technical reasons associated with manufacture and in order to be able to connect a plurality of connections towards the outside using a common multiple cable, several soldered assemblies or solder spots are usually positioned very close together (see DE 195 36 131 C2). Using conventional soldering tools, these assemblies or spots do, however, have to be soldered one after another individually.

However, applying soldering irons directly to the connection components concerned from the open "front face" is often a disadvantage, especially when—and above all in industrial-scale production with short pass times—incorrect positioning can occur as a result of the inevitable action of forces.

In the case of induction soldering, apparatus manufacturers do, however, typically recommend a high frequency of between 700 and 900 kHz depending on the thermal power to be applied. At the same time, the electrical power requirement is only relatively low (1 to 4 kW).

Tests carried out under the conditions of the possible applications discussed above with the recommended relatively high frequencies have not, however, made it possible to obtain satisfactory results. In particular, the conducting structures that act as soldered-connection faces on the surface of the lazing, which are made up of a thick baked-on layer of screen printing paste with a relatively high silver content, may heat up excessively and dissipate a great deal of heat while at the same time the components that are to be soldered have not yet become sufficiently hot. One cause could be that the conducting structure, or its material, has high absorption with respect to the waves generated by induction. The heating effect obtained by using high frequencies then either does not penetrate deep within a voluminous body or does so extremely slowly, but rather remains at the surface thereof (something also called the "skin effect", see, in this respect, DE 694 30 275 T2, page 36). In consequence, the short pass times do not allow the required depth of penetration to the other face of the thick layer concerned to be achieved with any certainty.

Document DE 196 36 216 A1 describes a device and a method for the induction heating of components, particularly for hardening and soldering, in which an induction loop or coil is combined with a conducting body to deflect or orientate the magnetic field. The loop/coil is made up of a tubular material that is a good conductor of electricity, which is cooled during the soldering operation by a circulating cooling fluid. The operating or frequency range recommended for heating metals by induction is from 10 kHz to 10 MHz. In that document, however, just one application to the hardening of the edges of bored holes is described in detail. The conducting body mentioned forms a core that can be introduced into the respective bore. The document gives no other information as to the production of installations or methods for soldering using inductive heating.

BRIEF SUMMARY OF THE INVENTION

The problem underlying the invention is to afford an improved method for the inductive soldering of connections to glazing units and a device particularly suited to implementing this method.

The magnitude and shape of the surface area of an induction loop or coil positioned in a soldering tool is consequently tailored to suit the magnitude and shape, respectively, of the respective multiple contact regions. This surface area may be very small, but as a general rule is several square centimetres in size. For example, it measures 0.5 to 70 $cm^2$ and may be larger still.

These tools may be applied to the surface of the glazing concerned on the opposite side to the soldering face. The magnetic field emitted by these tools passes through the material of the glazing with practically no attenuation, which means that the soldering heat required is released only from the back side of the glazing. Even any opaque (non-conducting) local coating at the edge of the surface of the glazing is penetrated by the magnetic field with practically no attenuation. At the same time, the smooth surface of the glazing forms an ideal bearing surface for the tool, and even the distance at which it lies from the actual solder spot is kept practically constant from one sheet of glazing to another by the glazing and layer thickness that is reproducible with negligible discrepancies. However, it is not strictly necessary to position the soldering tools on the face of the glazing situated facing the solder spots if the fixing of the necessary distance can be respected using other means. Likewise, it is possible to apply the soldering tools directly to the components that are to be soldered.

This technique can be employed with simple glazing and with laminated glazing.

In mass production, the tools may therefore advantageously be mounted in a fixed position in soldering devices or soldering stations, in which the glazing prepared for the making of the soldered connections is introduced and positioned. Keeping the tools stationary has the additional advantage that the necessary supply ducting does not need to be moved.

By moving away from the recommendations of the apparatus manufacturers, the frequency of the induced waves and respectively of the magnetic field, were markedly reduced, for experimental purposes, to a range ranging between 5 and 150 kHz. The magnetic field penetration depth in the applications described is thereby markedly greater. However, it is necessary to use more electrical power because relatively low-frequency radiation suffers from relatively high transmission losses in the stand-off gap and within the body of the glazing. It is also necessary to work with a higher magnetic field strength at low frequency.

In the light of the markedly improved soldering results which have a favourable knock-on effect on mass production, this aspect does, however, need to be taken into consideration. At the same time, a marked speeding-up of production is achieved because, even for very short pass times, all the nearby solder spots even in relatively extensive soldered-connection fields are soldered at the same time and with good process reliability. Using the relatively small high-frequency soldering tools, a relative movement between the tool and the respective glazing would also be needed. It has proved to be favourable, in the context of the present invention, for the loops or coils for induction soldering at relatively low frequencies to have markedly greater volumes than the loops or coils used for high-frequency induction.

Appropriate large-sized loops or coils have been used to make various experimental soldered connections which have all led to satisfactory results. Thus, for example, a five-pole antenna connection, four individual antenna connections in the form of press studs, and two heating conductor connections in addition to two antenna connections, have been soldered to typical glazing equipped differently, all of this having been done in the region of an opaque edge coating of the glazing with electrically conductive tracks printed thereon. As a result of the good penetration of the field lines into these conducting structures for low induction frequency the bodies or the (metal) contacts of the contact elements have been heated sufficiently and quickly enough by the magnetic field to melt their pre-tinning and assemble them reliably with the connection faces on the side of the glazing.

The soldering tools also experience practically no wear. The holding tools for positioning the components for soldering may be produced more simply and in a more compact form without soldering tools.

During the soldering operation, the components to be connected are pressed only freely against the surface of the glazing using simple clamping means, which are not themselves heated by the magnetic field. These tools may for example by made of plastic or ceramic or both, or may be lined with non-metallic parts in the regions where they come into contact with the components that are to be soldered. In order locally to optimize and deflect the magnetic field it is also possible to use clamping means made of ferrite materials.

Soldering from the "rear face" of a sheet of glazing (which in a vehicle is usually the exterior face) and the resulting direct application of heat yield the additional major structural advantage, namely that more complicated structural elements can be soldered.

In particular, with the exception of the actual solder spot, the components to be connected do not need to exhibit any free metal surface but may, for example, be entirely coated or overmoulded in plastic, and if appropriate may even contain components positioned in a second plane immediately above the contact points (see DE 198 56 663 C2). Such components may be used with no special protection in their assembly environment. A visual inspection of the soldered joint can also of course be carried out at the solder spot itself, for example using "inspection holes" (see DE 102 49 992 C1).

Naturally, the shape of the loop or of the coil, or of the tool which contains it, must be tailored to suit the respective particulars, in material terms, to suit the envisaged connection geometries (surface areas and shapes of the components in the region of the soldered-connection faces) so that the magnetic field lines can be orientated optimally on the components for heating. It is particularly advantageous to have ferrite elements in the tool in order to optimize the pattern of the field lines. In order to tailor it to suit curved glazing surfaces, corresponding preforming and/or an elastic intermediate layer on the contact face of the tool may prove advantageous.

Other details and advantages of the solution according to the invention will become apparent from the attached drawings of examples of possible applications and from the detailed descriptions thereof.

BRIEF DESCRIPTION OF THE DRAWINGS

In these schematic depictions which are not drawn to scale.

DETAILED DESCRIPTION OF THE PREFERRED EMBODIMENTS

Figure 1:
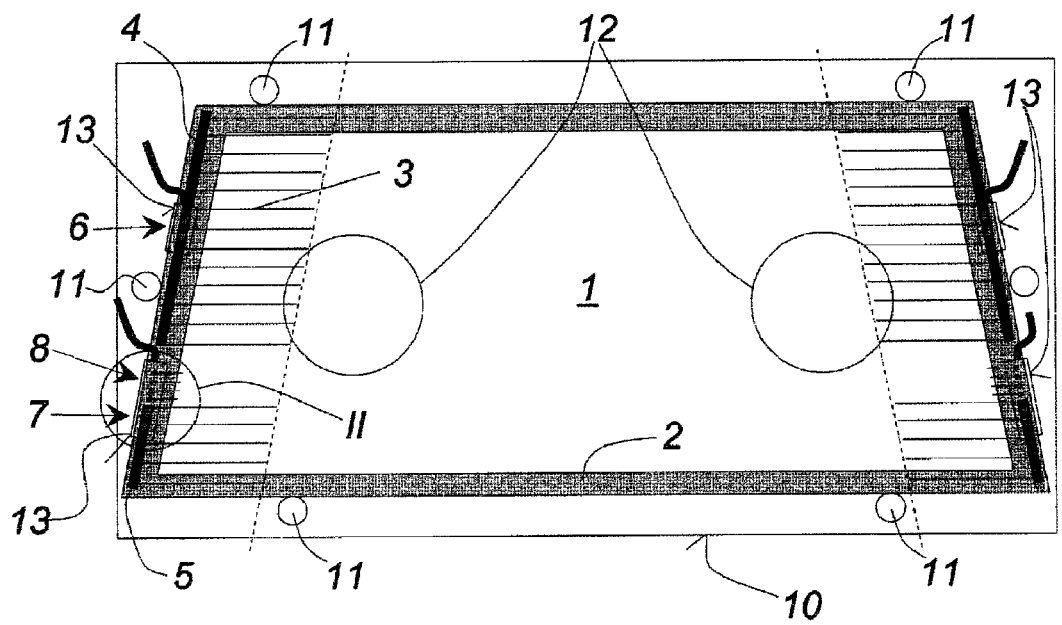
FIG. 1 depicts a view of a piece of glazing with connections for soldering, which is placed in a device for the inductive soldering of these connections for soldering.

FIG. 1 shows a trapezoidal sheet of glazing 1 made of glass or plastic, of which the top surface, in the direction of viewing, is provided along its edge with an opaque coating 2 (here shaded grey but in actual fact generally black), which is electrically non-conducting. This is, for example, the rear window of a motor vehicle, depicted here without curvature for reasons of simplicity. On its surface it is also provided with electrically conducting tracks or structures 3, for example heating conductors and antenna conductors, which extend through the field of view of the window and/or the side of the edge as far as the coating 2. Along the left-hand edge of the sheet of glazing 1 there are collector conductors 4 and 5 on the surface of the coating 2. Furthermore, several connection faces 6, 7, 8 (shown in paler grey in the illustration) intended for the electrical connection of the conducting structures 3 or of the collector conductors, and to which we will return in greater detail later on, are also provided.

Shown on the right-hand edge of the sheet of glazing is a reversed identical configuration of collector conductors and connection faces without the corresponding numerical references. The configurations of the collector conductors and of the connection faces may in actual fact differ from one side of the sheet of glazing to the other. The connection faces and the solder spots may also be positioned along the long sides of the shape of glazing shown here.

The configuration of the heating and antenna conducting structures 3 in the central field of vision of the sheet of glazing 1 is not depicted further. For the purposes of the present description this is of no importance because the description relates only to the making of the edge electrical connections of the conducting structures 3 by soldering with the heat produced by induction.

The conducting structures 3 are usually produced, as are the collector conductors 4, 5 and the connection faces 6, 7, 8 by printing (screen printing) a conducting printing paste (containing silver) using the thick layer technique with subsequent baking (on glass glazing, preferably at the time of bending).

The glazing 1 is placed in a device 10 indicated by a box, to which belong, amongst other things, the stops 11, the supports 12 and the soldering tools 13. Whereas the stops 11 are pressed against the lateral edges of the glazing 1 in order to position it in the plane, the supports 12 and the soldering tools 13 lie, in the direction of view, behind/under the glazing 1. It can be seen that the soldering tools 13 fixed in the device entirely cover the regions of the connection faces, in vertical projection onto the surface of the glazing. Their surface area facing towards the glazing measures several square centimetres.

The connection faces 6, 7 and 8 have to be connected to the outside of the glazing to electrical supply or connection lines corresponding to their function, or to antenna cables, respectively, these not having been depicted in FIG. 1.

Figure 2:
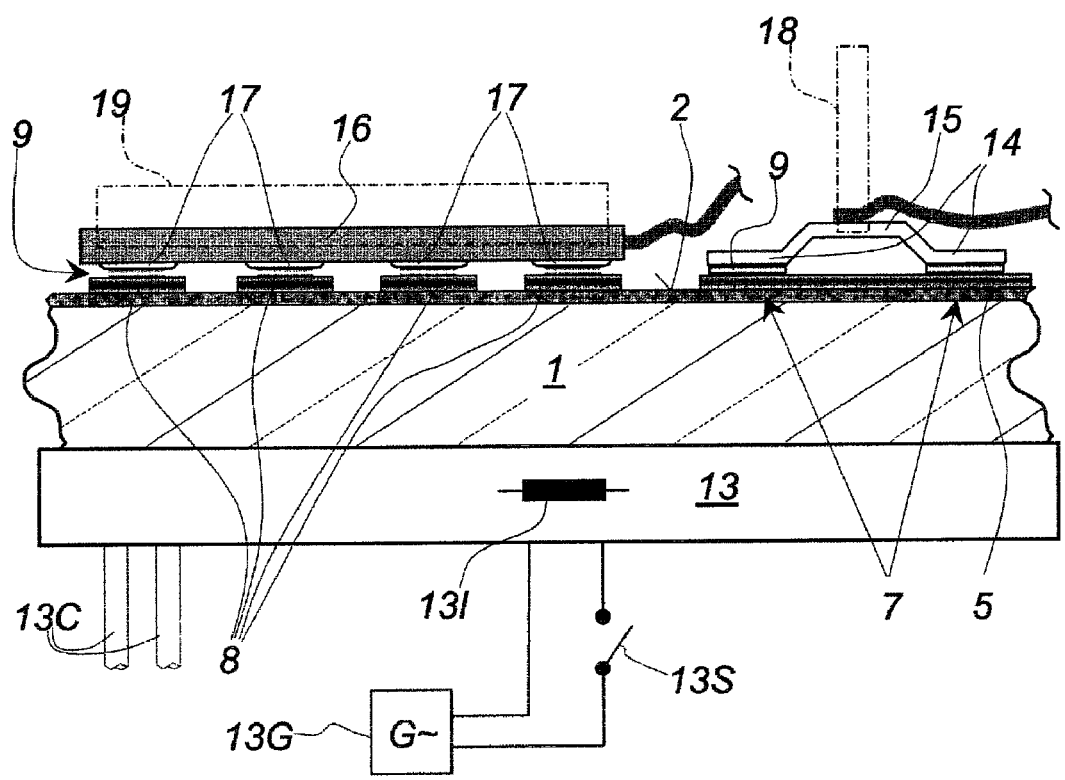
FIG. 2 shows an enlarged detail of FIG. 1 in the region of a multiple soldered-connection point.

A ring labelled "II" on the left-hand edge of the sheet of glazing 1 surrounds the region depicted in enlarged detail in FIG. 2, in order to explain in detail the method according to the invention and the corresponding device. The region encircled is also denoted hereinafter as the connection field. This in total has a defined surface area to which the associated soldering tool is tailored.

The connection field covered by an individual soldering tool could if need be be larger still. Likewise, an individual soldering tool may comprise two or more terms. This would be recommended if solder spots are to be produced on flat or only slightly curved or cylindrically curved glazing.

FIG. 2 shows a side view of the edge region of the glazing 1 laid out flat, viewed from the left side of FIG. 1. For elements that are identical, the same numerical references as were used in FIG. 1 have been kept. Although admittedly a flat sheet of glazing 1 has been depicted, the invention can naturally be applied also to curved glazing.

Visible on the opaque coating 2 are the two connection faces 7 and the four connection faces 8 of the connection field in the circle II of FIG. 1. On the twin connection faces 7, the two soldering shoes 14 of a bridge-shaped contact element 15 provided with a connecting cable have been applied. Such contact elements with a soldered flexible lead are known in the prior art (for example from EP 0 477 069 B1). They are often used for the electrical connection of heating fields to the on-board power supply of a vehicle. Specifically, such components are critical to subsequent soldering because the soldering of the lead must not be heated excessively. Such excessive heating can be avoided reliably using the method according to the invention.

Applied to the four connection faces 8 is a multiple contact element 16 also known per se which comprises four metal contacts 17 each of which has to be soldered to one of the connection faces 8. Likewise, the multiple contact element 16 is connected by a connecting cable. The latter may, for example, be an antenna cable, if appropriate in a diversity antenna environment.

The multiple contact element 16 exhibits a sheath, preferably made of an appropriate plastic (which is electrically insulating) in which its contacts 17 with its line connections to the connection cable are embedded. Free metal surfaces on the face of the multiple contact element situated opposite the glazing 1 are not required. Other electrical and/or electronic components (for example amplifiers) may also be located inside the sheath.

Each of the six solder spots shown in FIG. 2 is provided with a thin layer of solder 9 containing lead or free of lead (pre-tinned or bearing a deposit of solder), if appropriate with a flux incorporated or applied subsequently. It might be enough to apply a deposit of solder to just one of the two faces that are to be soldered, thus either to the connection faces 7, 8 or to the solder shoes 14 or contacts 17, if it can be guaranteed that the energy injected will be able to heat all the components enough to solder both sides firmly and if the non-tinned surface can be wetted with the solder.

The thicknesses of the coating 2, of the connection faces 7 and 8 and of the deposit of solder are not shown to scale here.

Chain line has been used to indicate clamping means 18, 19 which each position and press the contact sole 14 and the multiple contact element 16 on(to) the contact or solder spots. These do not need to have galvanic contact with the solder spots. These clamping means may, for example and advantageously, at the same time be remote-controlled holding and positioning tools in an automated production line. This dual function is indicated by the slight overlap of the clamping means with the contact elements illustrated. They pick up the contact elements, initially loose, from the respective stores, position them on the corresponding connection faces and hold them in place during the soldering operation until the solder hardens.

The soldering tool 13 is applied to the underside of the glazing 1, situated on the opposite side to the contact points 7 and 8, with (at least) one induction loop or coil 13I which is powered from a commercially available generator 13G with an AC voltage at adjustable frequency and power. Symbolically, also depicted is a switch 13S in the connection between the generator and the coil, by means of which switch the operation of the induction loop 13I can be controlled. Finally, if need be, the tool 13 can be cooled by connecting hoses 13C. In contrast with the schematic depiction, the cooling fluid inlet and the electrical power supply lines may be gathered together.

The soldering tools 13, which are large by comparison with the conventional high-frequency induction loops or coils, comprise coils or loops the sizes of which correspond more or less to the length and width of the soldering tool. Intermediate spaces may be filled in a way known per se using ferrite bodies or bodies made of other equally suitable materials. In this way, the magnetic field that they emit can be optimized in such a way that it is deflected and that it acts as intensively and as concertedly as possible on the solder spots. It is therefore possible not so much to obtain great homogeneity as rather to heat as quickly and as intensively as possible determined or small-area spots—namely the solder spots and the metal contact elements applied to them.

Similarly, it may also be advantageous for the clamping means also to be equipped with ferrite elements or components having the same functions in order to shape and guide the field lines. This option, just like the soldering tool itself, needs to be individually tailored to the respective connection field and to its solder spots.

In order constantly to achieve high soldering quality, it is important for the distance between the soldering tool 13 and the solder spots to be kept as constant as possible on each glazing sheet. In the exemplary embodiment illustrated here, the soldering tool is therefore applied directly to the surface of the glazing. Naturally, any damage to the smooth surface of the glazing must be prevented. Here it is possible according to the invention to provide a very small well-defined stand-off between the soldering tool and the underside of the glazing, in order to completely avoid any contact.

Thus, if a tool with an induction coil is to be applied to a surface of a curved sheet of glazing rather than the flat glazing 1 shown here, it would need to be tailored to suit the local contours of the glazing, in the sense of precise reproducible positioning, or would need to hug this surface, possibly by means of an elastic intermediate layer.

As a preference, these soldering tools are positioned fixedly/stationary in the device 10. The sheet of glazing to be treated is brought in each time using conveyor means not depicted and is positioned between the stops 11 on the supports 12.

Of course, it is however also possible to apply soldering tools that can move by means of robots into reproducible positions on a sheet of glazing that is to be treated. For example, this solution will be preferred when it is not necessary to process large numbers of components on glazing units that always remain the same, or when a frequent change in model has to be processed using the same device.

In order to produce soldered assemblies, the induction loop 13I is supplied with current at the desired frequency (between 5 and 100 kHz) by connecting its electrical power supply (closing the switch 13S). A typical power of the order of 1.3 to 15 kW is set, although this may naturally be altered according to the remoteness of the loop or of the coil, the (total) surface area of the solder spots and the masses to be heated. The magnetic field passes through the material of the glazing a few millimetres thick and the opaque edge coating 2 a few microns thick without excessive attenuation; the smaller the stand-off, the lower the attenuation. There is a release of heat in the metallic components of the contact points 7, 8 and solder deposits 9 and also in the metallic components (solder legs 14, contacts 17) of the applied contact elements 15 and 16. The low frequency, in addition to the advantage of allowing a relatively deep penetration, exhibits the additional advantage that certain components that are sensitive to electromagnetic waves can also be soldered without destroying these components.

The time for which the magnetic field needs to be in action until the solder completely melts and the best frequency range can be determined simply and repeatedly by tests, and simulated using appropriate software. After the soldering operation, the magnetic field is switched off (the switch 13S is opened). The glazing 1 is still held briefly, as are the clamping means 18, 19, until the solder has hardened and the electrical connections hold firm without additional mechanical fixing. Thereafter, the glazing 1 is transferred on to the subsequent processing operations.

The invention claimed is:

1. A method for soldering a plurality of electrical connections, in which contact elements have to be soldered to soldered-connection faces positioned on a non-metallic glazing, the method comprising:
providing a soldering tool configured to emit a magnetic field of a predetermined magnitude, the soldering tool including a loop or a coil having a magnitude and shape configured to correspond with a surface area on the non-metallic glazing that covers a region of plural soldered-connection faces and encompasses a plurality of solder spots to be heated simultaneously in a soldering operation;
positioning the soldering tool with respect to the non-metallic glazing such that the magnetic field reliably heats the plurality of solder spots during the soldering operation; and
performing the soldering operation on the non-metallic glazing by emitting the magnetic field of the predetermined magnitude by the soldering tool towards the plurality of solder spots simultaneously so as to heat the plurality of solder spots by induction,
wherein a frequency of an AC voltage applied to the loop or to the coil is tailored to a connection geometry and set at least in a range of 5 to 150 kHz.

2. The method according to claim 1, wherein the frequency of the AC voltage is set to between 10 and 100 kHz.

3. The method according to claim 1, wherein the frequency of the AC voltage is set to between 12 and 70 kHz.

4. The method according to claim 1, wherein the frequency of the AC voltage is set to between 15 and 40 kHz.

5. The method according to claim 1, wherein emitting the magnetic field is performed by disposing the soldering tool adjacent to a side surface of the non-metallic glazing, the side surface being opposite of the plurality of solder spots, such that the magnetic field is emitted through the glazing.

6. The method according to claim 1, further comprising fixing the contact elements to be soldered to the soldered-connection faces to the soldered-connection faces using a clamping means.

7. The method according to claim 6, further comprising combining the clamping means with tools to hold and position the contact elements.

8. The method according to claim 1, further comprising:
securing the glazing and the soldering tool in a device, such that the glazing and the soldering tool are stationary during the soldering operation.

9. The method according to claim 1, further comprising:
using a robot to guide and apply the soldering tool on the glazing or to guide the glazing on the soldering tool.

10. A device for soldering a plurality of electrical connections, comprising:
means for fixing a glazing during a soldering operation;
a soldering tool having at least one loop or at least one coil, the soldering tool configured to emit a magnetic field, wherein a magnitude and shape of the at least one loop or coil corresponds to a surface area of a connection field, the connection field including a plurality of connection faces positioned on the glazing;
means for mutual positioning of the soldering tool and of the connection field, such that the magnetic field reliably heats a plurality of solder spots simultaneously in a soldering operation; and
a generator connected to the soldering tool, the generator configured to produce an AC voltage at a frequency at least in a range of 5 to 150 kHz.

11. The device according to claim 10, in which the soldering tool includes more than one loop or coil.

12. The device according to claim 10, the soldering tool further includes components for deflecting and guiding field lines of the magnetic field.

13. The device according to claim 10, the soldering tool further includes an elastic intermediate layer to press against a surface of the glazing.

14. The device according to claim 10, further comprising:
a robot that guides and applies the soldering tool on the glazing and the glazing on the soldering tool.

15. The device according to claim 10, further comprising:
clamping means for pressing contact elements onto the plurality of solder spots.

16. The device according to claim 15, wherein the clamping means is combined with tools for positioning the contact elements.

17. The device according to claim 15, wherein the clamping means includes components for deflecting and guiding field lines of the magnetic field.

18. The method according to claim 6, wherein the clamping means includes ferrite.

19. The method according to claim 1, further comprising:
depositing solder on at least one of the soldered-connection faces and the contact elements, wherein the solder has flux incorporated therein or flux is applied to the solder subsequently.

* * * * *

UNITED STATES PATENT AND TRADEMARK OFFICE
CERTIFICATE OF CORRECTION

PATENT NO. : 8,278,609 B2
APPLICATION NO. : 11/720370
DATED : October 2, 2012
INVENTOR(S) : Bernhard Reul It is certified that error appears in the above-identified patent and that said Letters Patent is hereby corrected as shown below:

In the Specification

Column 2, line 66, change "waves and" to --waves, and--.

In the Claims

Claim 1, Column 7, lines 32-54, replace:

"1. A method for soldering a plurality of electrical connections, in which contact elements have to be soldered to soldered-connection faces positioned on a non-metallic glazing, the method comprising:
    providing a soldering tool configured to emit a magnetic field of a predetermined magnitude, the soldering tool including a loop or a coil having a magnitude and shape configured to correspond with a surface area on the non-metallic glazing that covers a region of plural soldered-connection faces and encompasses a plurality of solder spots to be heated simultaneously in a soldering operation;
    positioning the soldering tool with respect to the non-metallic glazing such that the magnetic field reliably heats the plurality of solder spots during the soldering operation; and
    performing the soldering operation on the non-metallic glazing by emitting the magnetic field of the predetermined magnitude by the soldering tool towards the plurality of solder spots simultaneously so as to heat the plurality of solder spots by induction,
    wherein a frequency of an AC voltage applied to the loop or to the coil is tailored to a connection geometry and set at least in a range of 5 to 150 kHz.".

with the following claim 1:

--1. A method for soldering a plurality of electrical connections, in which contact elements have to be soldered to soldered-connection faces positioned on a non-metallic Signed and Sealed this
Twelfth Day of November, 2013

Teresa Stanek Rea
*Deputy Director of the United States Patent and Trademark Office*

CERTIFICATE OF CORRECTION (continued)
U.S. Pat. No. 8,278,609 B2 glazing, the method comprising:

providing a soldering tool configured to emit a magnetic field of a predetermined magnitude, the soldering tool including a loop or a coil having a size and shape configured to correspond with a surface area on the non-metallic glazing that covers a region of plural soldered-connection faces and encompasses a plurality of solder spots of the contact elements;

positioning the soldering tool with respect to the non-metallic glazing such that a current induced from the magnetic field into the plurality of solder spots reliably heats the solder spots simultaneously during a soldering operation, wherein the soldering operation is performed on the non-metallic glazing by emitting the magnetic field of the predetermined magnitude as the soldering tool moves towards the plurality of solder spots simultaneously, and wherein a frequency of an AC voltage applied to the loop or to the coil is tailored to a connection geometry and set at least in a range of 5 kHz to 150 kHz.--.

Claim 2, Column 7, line 56, change "10" to --10 kHz--.

Claim 3, Column 7, line 58, change "12" to --12 kHz--.

Claim 4, Column 7, line 60, change "15" to --15 kHz--.

Claim 10, Column 8, lines 19-33, replace:

"10. A device for soldering a plurality of electrical connections, comprising:
means for fixing a glazing during a soldering operation;
a soldering tool having at least one loop or at least one coil, the soldering tool configured to emit a magnetic field, wherein a magnitude and shape of the at least one loop or coil corresponds to a surface area of a connection field, the connection field including a plurality of connection faces positioned on the glazing;
means for mutual positioning of the soldering tool and of the connection field, such that the magnetic field reliably heats a plurality of solder spots simultaneously in a soldering operation; and
a generator connected to the soldering tool, the generator configured to produce an AC voltage at a frequency at least in a range of 5 to 150 kHz.".

with the following claim 10:

--10. A device for soldering a plurality of electrical connections, comprising:
means for fixing a glazing during a soldering operation;
a soldering tool having at least one loop or at least one coil, the soldering tool configured to emit a magnetic field, wherein the loop or coil has a size and shape that corresponds to a surface area of a connection field, the connection field including a plurality of connection faces positioned on the glazing;

means for mutual positioning of the soldering tool and of the connection field, such that the magnetic field reliably heats a plurality of solder spots simultaneously in a soldering operation; and a generator connected to the soldering tool, the generator configured to produce an AC voltage at a frequency at least in a range of 5 kHz to 150 kHz.--.